United States Patent [19]

Higbee

[11] Patent Number: 4,830,310

[45] Date of Patent: May 16, 1989

[54] SEAT BELT RETRACTOR WITH COMFORT MECHANISM

[75] Inventor: Wallace C. Higbee, Romeo, Mich.

[73] Assignee: TRW Vehicle Safety Systems Inc., Lyndhurst, Ohio

[21] Appl. No.: 124,888

[22] Filed: Nov. 24, 1987

[51] Int. Cl.[4] ...................... B60R 22/38; B60R 22/40
[52] U.S. Cl. ........................ 242/107.7; 242/107.4 A; 242/107.4 B; 280/806; 280/807
[58] Field of Search .......... 242/107.7, 107.6, 107.4 A, 242/107.4 B; 280/807, 806, 808

[56] References Cited

U.S. PATENT DOCUMENTS

| | | | |
|---|---|---|---|
| 4,065,072 | 12/1977 | Magyar | 242/107.7 |
| 4,124,175 | 11/1978 | Cislak | 242/107.7 |
| 4,153,274 | 5/1979 | Rogers, Jr. et al. | 242/107.7 |
| 4,367,851 | 1/1983 | Maeda et al. | 242/107.7 |
| 4,458,920 | 7/1984 | Ozaki | 242/107.7 |
| 4,564,155 | 1/1986 | Tsukamoto | 242/107.6 X |
| 4,616,141 | 10/1986 | Hollowell | 242/107.7 X |

Primary Examiner—John M. Jillions
Attorney, Agent, or Firm—Tarolli, Sundheim & Covell

[57] ABSTRACT

A seat belt retractor for a vehicle includes a spindle on which belt webbing is wound. The spindle is supported for rotation in belt retraction and belt withdrawal directions. Rotation of the spindle causes rotation of a first ratchet wheel from which a plurality of teeth extend. A lever is movable into engagement with a tooth on the first ratchet wheel to block rotation of the first ratchet wheel in the belt withdrawal direction. The spindle is also connected to a second ratchet wheel from which a plurality of teeth extend. A resiliently deflectable member is engageable with one of the plurality of teeth on the second ratchet wheel to block rotation of the spindle in the belt retraction direction. The resiliently deflectable member deflects to permit the lever to disengage from the first ratchet wheel and prevent a double lock condition in which the spindle cannot rotate in either the belt withdrawal direction or belt retraction direction.

15 Claims, 7 Drawing Sheets

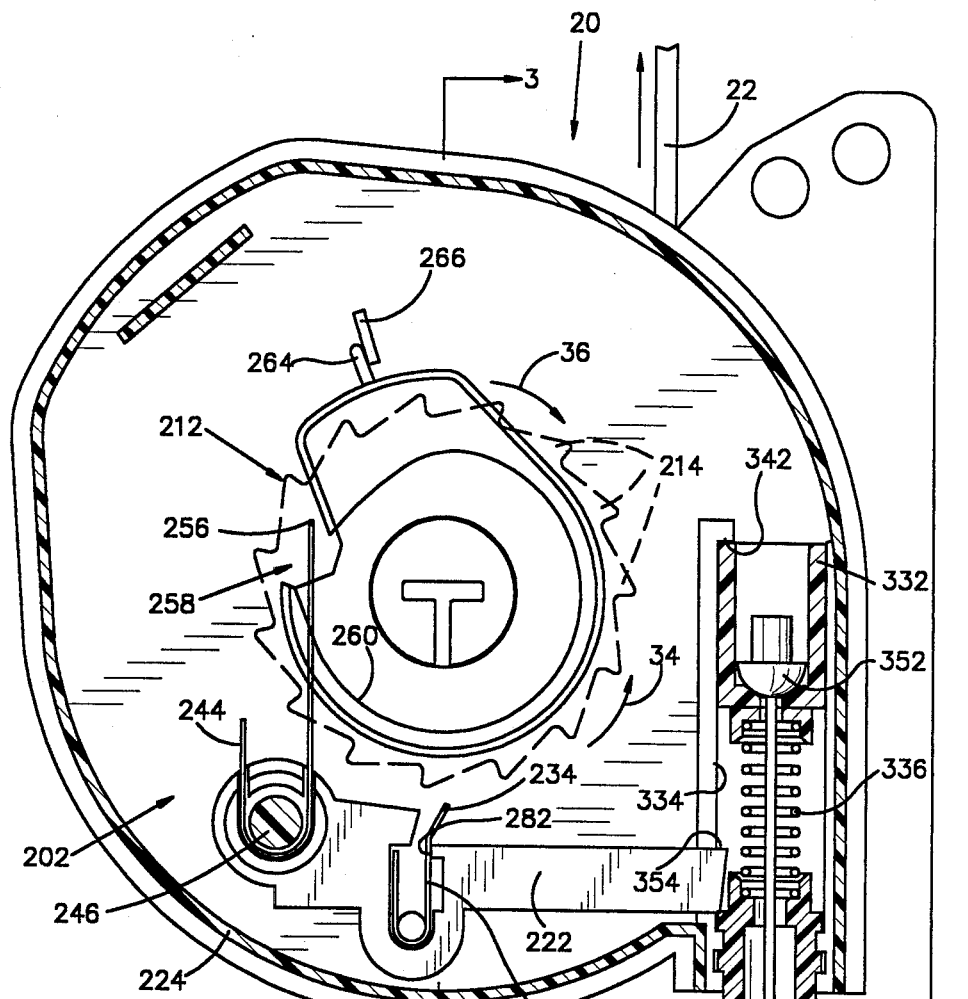
FIG.2
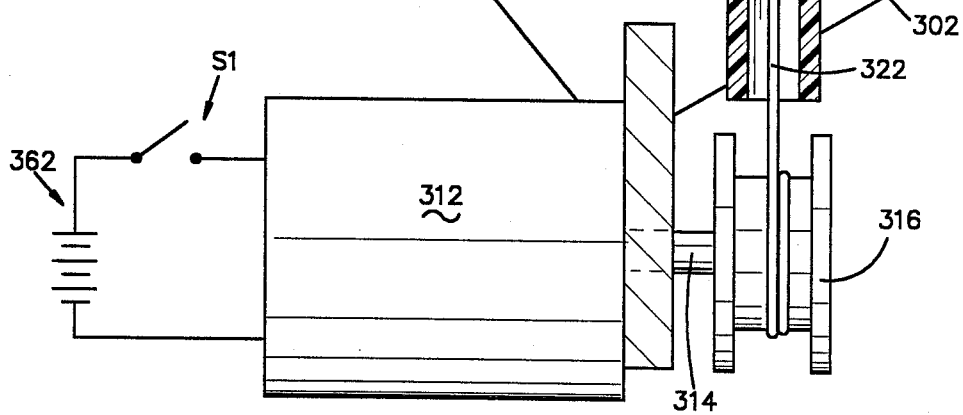

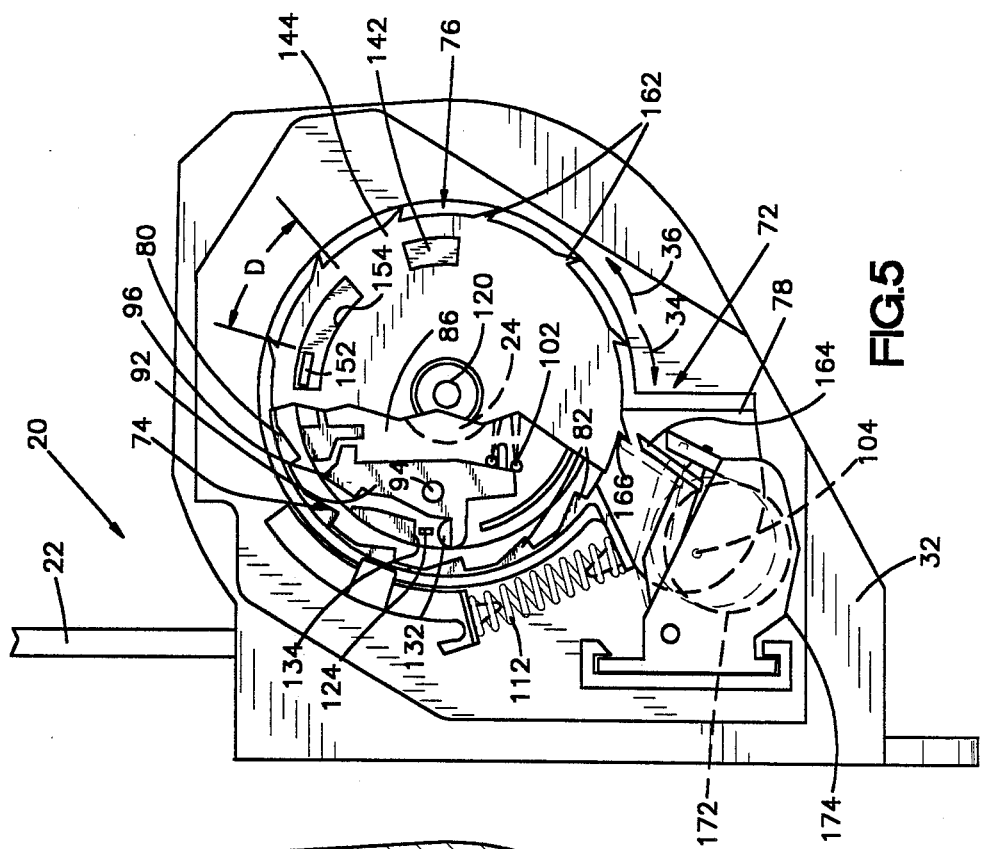
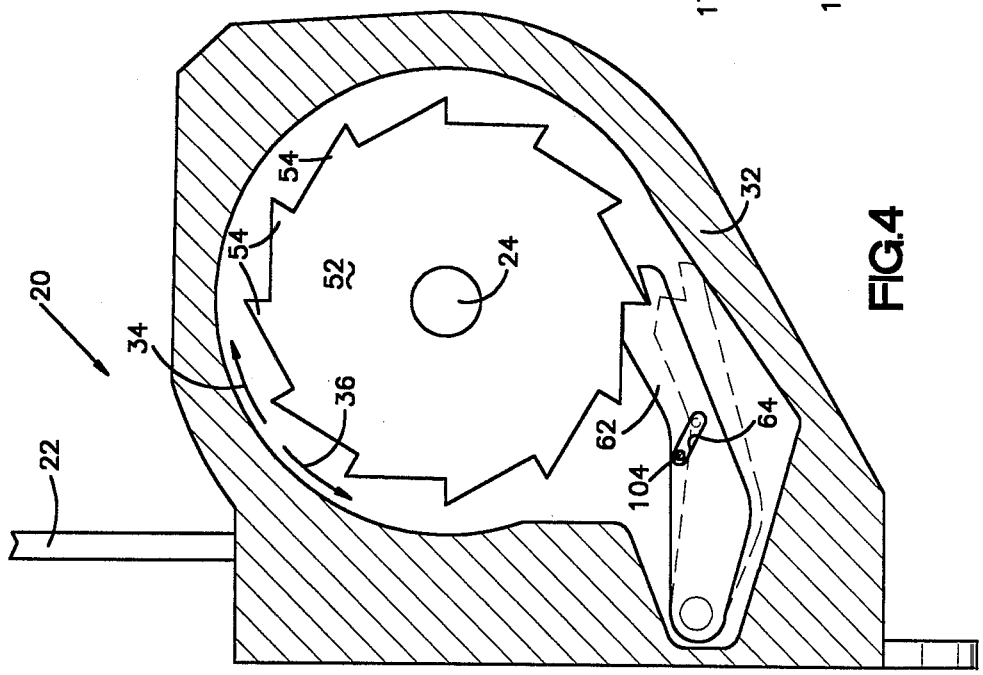

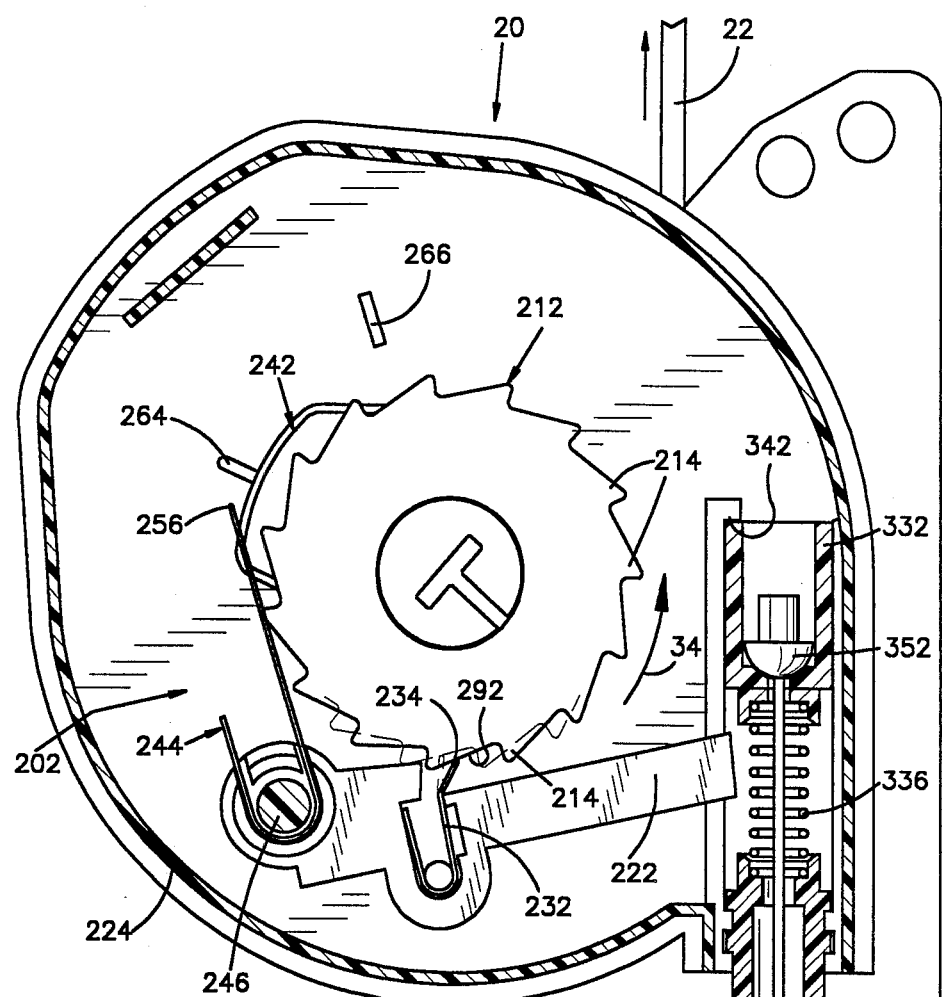
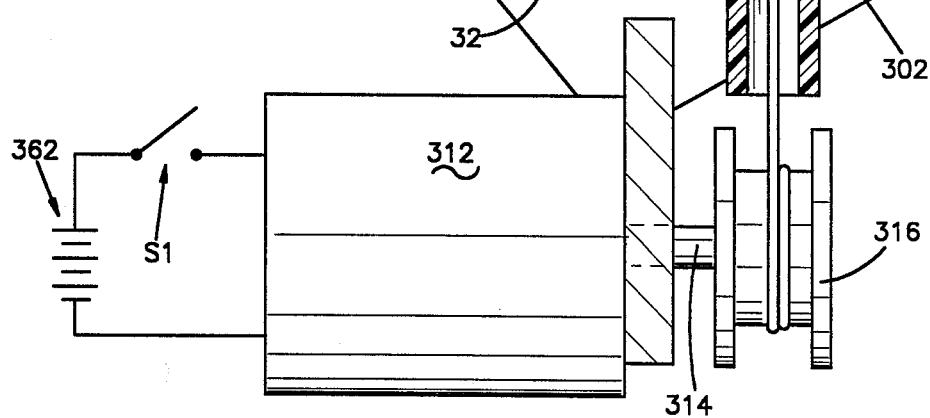
FIG.9 ered into engagement with a tooth on the second
SEAT BELT RETRACTOR WITH COMFORT MECHANISM

BACKGROUND OF THE INVENTION

1. Field of the Invention

The present invention relates to a seat belt retractor for use in an automotive vehicle. In particular, the present invention relates to a seat belt retractor having a comfort mechanism for preventing tension exerted by the seat belt webbing from acting against a vehicle occupant during nonemergency situations.

2. Description of the Prior Art

A known seat belt retractor of the vehicle sensitive and web sensitive type is disclosed in U.S. Pat. No. 4,467,480. The retractor has a spool or spindle to which seat belt webbing is connected. The spindle is supported for rotation in the belt withdrawal and belt retraction directions. A first ratchet wheel is connected to and rotates with the spindle. A locking pawl is supported for pivotal movement into engagement with the first ratchet wheel for blocking rotation of the spindle in the belt withdrawal direction. The seat belt retractor is web sensitive. Thus, the spindle is blocked from rotating in the belt withdrawal direction in response to the seat belt webbing being withdrawn at a rate above a predetermined rate. An inertia member lags behind the rotation of the spindle when the seat belt webbing is withdrawn above the predetermined rate. The spindle, thus, rotates relative to the inertia member and the locking pawl is moved into engagement with the first ratchet wheel.

The seat belt retractor is also vehicle sensitive. Specifically, the inertia member has a plurality of teeth extending therefrom. A mass moves in response to acceleration or deceleration of the vehicle above a predetermined rate to pivot a lever toward the inertia member. When the spindle is rotated in the belt withdrawal direction, a tooth on the inertia member engages the lever to block rotation of the inertia member in the belt withdrawal direction. Thus, upon rotation of the spindle in the belt withdrawal direction, rotation of the spindle relative to the inertia member occurs and the locking pawl is moved into engagement with the first ratchet wheel.

Such a seat belt retractor may also include a comfort mechanism or a tension eliminator to reduce the force of a retraction or return spring acting through the seat belt webbing against a vehicle occupant. The comfort mechanism includes a second ratchet wheel connected with the spool for joint rotation. A comfort member is brought into engagement with a tooth of the second ratchet wheel to actuate the comfort mechanism and prevent rotation of the spindle in the belt retraction direction.

The retractor may encounter a condition termed a "double lock" in which the spindle is blocked from rotating in both the belt retraction and the belt withdrawal directions. The "double lock" can occur when the comfort mechanism is actuated by the comfort member engaging a tooth on the second ratchet wheel and the lever simultaneously engages a tooth on the inertia member.

SUMMARY OF THE INVENTION

The seat belt retractor, according to the present invention, includes a comfort mechanism. The retractor includes means for preventing a "double lock" condition when the comfort mechanism is actuated.

In a preferred embodiment of the present invention, the seat belt retractor includes a spindle on which seat belt webbing is wound. The spindle is supported for rotation in a belt retraction direction and a belt withdrawal direction. A first ratchet wheel is connected to and rotates with the spindle. A plurality of teeth extend from the first ratchet wheel. A locking pawl is movable into engagement with a tooth on the first ratchet wheel for blocking rotation of the first ratchet wheel in the belt withdrawal direction. The locking pawl is moved into locking engagement with the first ratchet wheel upon engagement of an actuating lever with a tooth of an inertia member. A second ratchet wheel is also connected to and rotates with the spindle. A plurality of teeth extend from the second ratchet wheel. The retractor includes a mechanism that blocks rotation of the spindle in the belt retraction direction by engaging the second ratchet wheel and also prevents the aforementioned double lock condition.

The mechanism for blocking rotation of the spindle in the belt retraction direction and for preventing the double lock condition includes a resiliently deflectable member for engaging one of the plurality of teeth on the second ratchet wheel. The resiliently deflectable member blocks rotation of the spindle in the belt retraction direction. However, the resiliently deflectable member deflects to allow a predetermined amount of rotation of the second ratchet wheel and spindle in the belt retraction direction to permit the actuating lever to disengage the tooth on the inertia member, thereby preventing the double lock condition.

BRIEF DESCRIPTION OF THE DRAWINGS

Further features of the present invention will become apparent to those skilled in the art to which the present invention relates from reading the following specification with reference to the accompanying drawings, in which:

FIG. 2 is an enlarged cross sectional view of the comfort mechanism of the retractor of FIG. 1, taken approximately along line 2—2 of FIG. 1;

FIG. 4 is a cross sectional view of the retractor of FIG. 1, taken approximately along line 4—4 of FIG. 1;

FIG. 5 is a cross sectional view of the retractor of FIG. 1 with parts broken away, taken approximately along line 5—5 of FIG. 1; and FIGS. 6–9 are cross sectional views similar to FIG. 2 illustrating parts in different positions.

DESCRIPTION OF A PREFERRED EMBODIMENT

Figure 1:
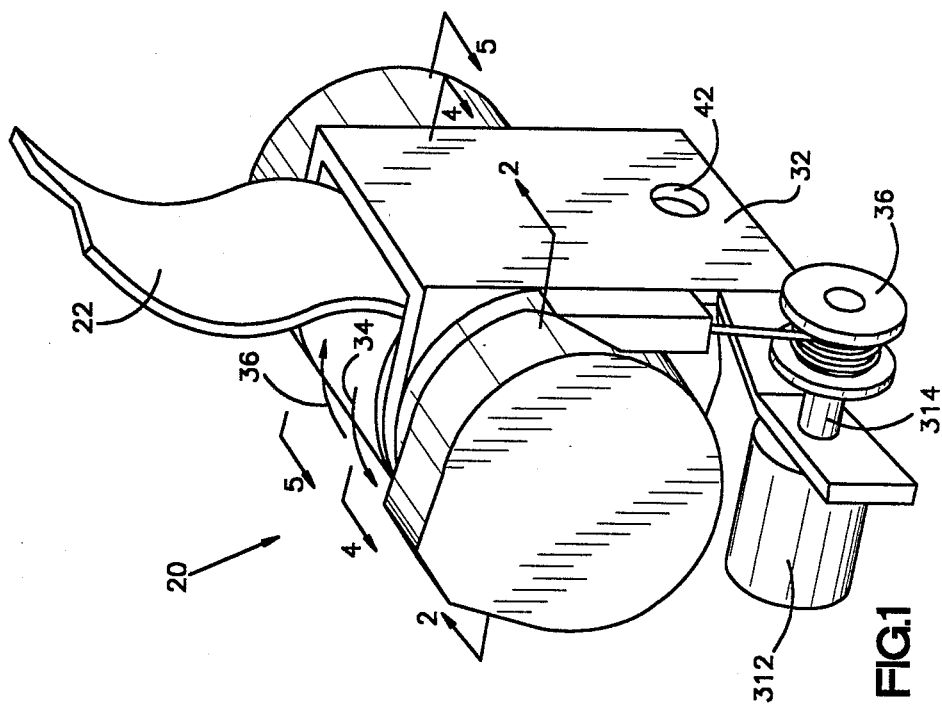
FIG. 1 is a perspective view of a seat belt retractor, according to the present invention.

FIG. 1 illustrates a seat belt retractor 20, according to the present invention, for use in an automotive vehicle. Seat belt webbing 22 extends from the retractor 20 for engaging a vehicle occupant, as is known. The seat belt webbing 22 is wound on a spindle 24 (FIG. 3) of the retractor 20. A frame 32 supports the spindle 24 for rotation in a seat belt withdrawal direction 34 and a seat belt retraction direction 36. An opening 42 in the frame 32 receives a known fastener (not shown) for connecting the retractor 20 to the vehicle.

An emergency locking or first ratchet wheel 52 (FIG. 4) is connected to and rotates with the spindle 24. A plurality of ratchet teeth 54 are spaced equally about the outer periphery of the first ratchet wheel 52. A pawl 62, pivotally mounted on the frame 32, is movable into engagement with one of the plurality of teeth 54 on the first ratchet wheel 52. When the pawl 62 engages a tooth 54, rotation of the first ratchet wheel and the spindle 24 in the belt withdrawal direction 34 is blocked.

An actuator mechanism 72 (FIG. 5) moves the pawl 62 toward the ratchet wheel 52 to engage one of the plurality of teeth 54. The actuator mechanism 72 moves the pawl 62 in response to the seat belt webbing 22 being withdrawn from the retractor 20 at a rate above a predetermined rate or in response to sudden acceleration or deceleration of the vehicle in any direction at a rate above a predetermined rate.

The actuator mechanism 72 includes a pilot sensor 74. The pilot sensor 74 senses relative rotation between the spindle 24 and another ratchet wheel or inertia member 76 to move the pawl 62. The pilot sensor 74 includes a pilot sensor base 78 supported by the frame 32 for a relatively small amount of relative rotation. The pilot sensor base 78 has an annular ring portion 80. A plurality of teeth 82 are equally spaced about the inner periphery of the annular ring portion 80. A circular plate 86 is disposed within the annular ring portion 80 of the pilot sensor base 78 and is connected to the end of the spindle 24 for rotation with the spindle.

A pilot pawl 92 is received on a pin 94 extending from the plate 86. The pilot pawl 92 is pivotal about the pin 94. The pilot pawl 92 has an end portion 96 for engaging one of the teeth 82 on the annular ring portion 80. The pilot pawl 92 is normally biased away from engaging the teeth 82 by a spring 102. When the pilot pawl 92 pivots and engages one of the teeth 82 on the annular ring portion 80, the pilot sensor base 78 is coupled with the spindle 24 and is driven by rotation of the spindle.

A pin 104 extends from the pilot sensor base 78 in a direction generally parallel to the longitudinal central axis A of the spindle 24. The pin 104 extends into a slot 64 in the pawl 62. Upon rotation of the pilot sensor base 78 in the clockwise direction, as viewed in FIG. 5, which corresponds to the belt withdrawal direction 36, the pin 104 engages a surface defining the slot 64 to drive the pawl 62 to pivot counterclockwise, as viewed in FIG. 4, toward the first ratchet wheel 52.

The inertia member 76 is supported by a shaft 120 connected to the spindle 24, and rotates relative to the shaft 120. The inertia member 76 is driven by rotation of the spindle 24. The inertia member 76 has a projection 124 extending axially towards the spindle 24. The projection 124 extends into a space between an arm 132 of the pilot pawl 92 and a drive surface 134 of the plate 86. Rotation of the inertia member 76 lags behind rotation of the spindle 24 when the seat belt webbing 22 is withdrawn at a rate of acceleration above a predetermined rate. When the inertia member 76 lags behind rotation of the spindle 24 in the belt withdrawal direction, the projection 124 engages the arm 132 of the pilot pawl 92 to pivot the pilot pawl about the pin 94. The end portion 96 of the pilot pawl 92 then engages one of the teeth 82 to drive the pilot sensor base 78 in response to rotation of the spindle 24.

The inertia member 76 includes a metallic disk 142 and a plastic clutch disk 144. The clutch disk 144 is rotatable relative to the disk 142. The clutch disk 144 is biased by a spring (not shown) in the belt withdrawal direction 34 relative to the disk 142. The clutch disc 144 is rotatable relative to the disk 142 in the retraction direction 36 for an arcuate length D which is limited by a projection 152 on the disk 142 which extends into an arcuate slot 154 in the clutch disk 144.

A plurality of ratchet teeth 162 are equally spaced about the outer periphery of the clutch disk 144. A lever arm 164 is pivotable into engagement with one of the teeth 162 to block rotation of the clutch disk 144. When rotation of the clutch disk 144 in the belt withdrawal direction 34 is blocked, any withdrawal of the belt webbing 22 rotates the spindle 24 and disk 142 relative to the clutch disk. This relative rotation causes the projection 124 to move the pilot pawl 92 to engage a tooth 82 to effect pivoting of the pawl 62 toward the first ratchet wheel 52.

The lever arm 164 is pivoted by a spherical mass 172 supported by a cup 174. The cup 174 is attached to the frame 32. The spherical mass 172 moves within the cup 174 to pivot the lever arm 164 toward the clutch disk 144 in response to the vehicle accelerating or decelerating at a rate above a predetermined rate.

Figure 3:
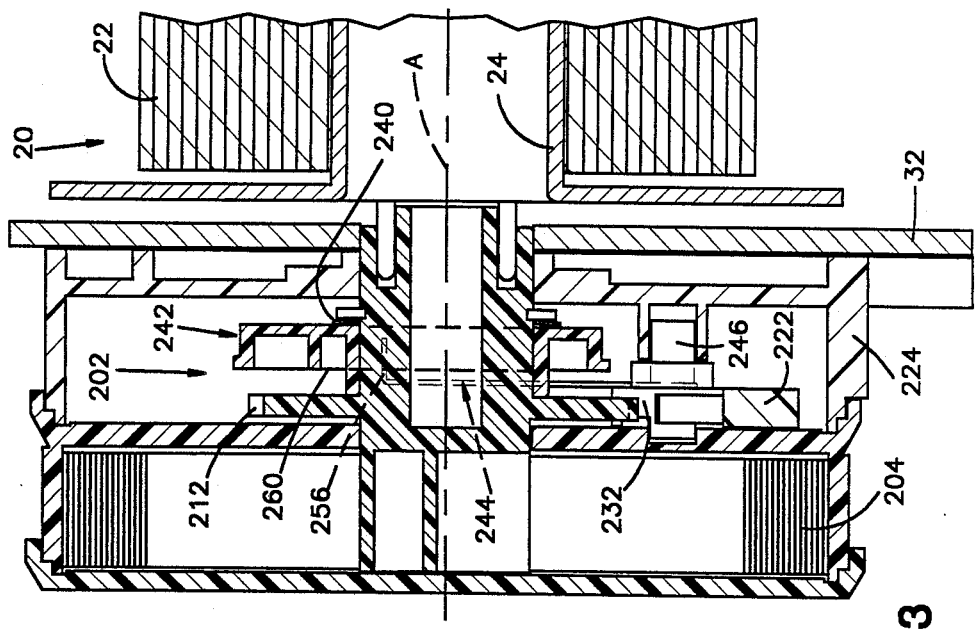
FIG. 3 is a cross sectional view of the comfort mechanism of FIG. 2, taken approximately along line 3—3 of FIG. 2.

The seat belt retractor 20 also includes a tension eliminator or comfort mechanism 202 (FIG. 2) which is actuated after the belt webbing 22 is extended from the retractor and buckled. The spindle 24 is biased to rotate in the belt retraction direction 36 by a return spring 204 (FIG. 3). When the comfort mechanism 202 is actuated, rotation of the spindle 24 in the belt retraction direction 36 is blocked so the biasing force of the return spring 204 is not transmitted through the belt webbing 22 to pull the belt webbing tightly against the vehicle occupant.

The comfort mechanism 202 (FIG. 2) includes a comfort or second ratchet wheel 212 (shown in FIGS. 2, 6, 7 and 8 in phantom line for clarity of illustration). The second ratchet wheel 212 is connected to and rotates with the spindle 24. A plurality of teeth 214 are equally spaced around the outer periphery of the second ratchet wheel 212. A latch 222 is supported at one end for pivotal movement by a shaft 246 that extends from a housing 224. The housing 224 is attached to the frame 32. The latch 222 is pivotable toward and away from the second ratchet wheel 212.

A leaf spring member 232 is carried by the latch 222 intermediate the shaft 246 and the free end 354 of the latch. The leaf spring 232 is formed in a U-shaped configuration and has an angled end portion 234. The leaf spring 232 is resiliently deflectable. When the latch 222 pivots toward the second ratchet wheel 212, the angled end portion 234 of the leaf spring 232 engages a tooth 214 on the second ratchet wheel, as viewed in FIG. 6. Rotation of the spindle 24 in the belt retraction direction 36 is, thus, blocked to prevent tension in the belt webbing 22 due to the bias of the return spring 204 from acting against the vehicle occupant.

A spring wire arm 244 is connected to the latch 222 adjacent the shaft 246 and is used to move the latch toward and away from the second ratchet wheel 212. A bight portion 248 of the spring arm 244 is disposed in a U-shaped groove 252 formed in the portion of the latch 222 adjacent the shaft 246. One of the legs 254 of the spring arm 244 is considerably longer than the other of the legs. As viewed in FIG. 3, the longer leg 254 of the spring arm 244 has an end portion 256 which is disposed approximately perpendicular to the longer leg. The end portion 256 of the spring arm 244 interacts with a surface of a cam 242 to actuate the comfort mechanism 202. When the end portion 256 of the spring arm 244 engages an actuating surface 262 of the cam 242, as illustrated in FIG. 6, the spring arm pivots the latch 222 toward the second ratchet wheel 212.

The cam 242 rotates with the second ratchet wheel 212 and spindle 24 during rotation of the spindle in the belt withdrawal direction 34 and the belt retraction direction 36. The cam 242 has a projection 264 which extends radially from the cam and which engages a stop 266 on the housing 224 to limit rotation of the cam to just under one complete revolution.

The comfort mechanism 202 is actuated by the cam 242. The cam 242 is frictionally driven through a spring washer 240 by rotation of the spindle 24 in response to the vehicle occupant withdrawing the belt webbing 22 from the retractor 20 a predetermined distance. Upon withdrawal of the belt webbing 22, the cam 242 rotates counterclockwise to engage the right (as viewed in FIG. 2) surface of the stop 266 after almost one complete revolution. The belt webbing 22 may be withdrawn further from the retractor 20 but the cam 242 will not rotate farther in a counterclockwise direction from this position because the projection 264 on the cam 242 engages stop 266 and the spring washer 240 permits the spindle 24 to rotate relative to the cam 242. When the belt webbing 22 is released, the spindle 24 is rotated in the belt retraction direction 36 by the return spring 204. The cam 242 then rotates in a clockwise direction, and the end portion 256 of the spring arm 244 enters the cam 242 through opening 258. The end portion 256 rides on surface 260 during this rotation of the spindle 24 in the belt retraction direction 36 until the end portion 256 of the spring arm 244 engages an actuating surface 262 of the cam 242.

Figure 6:
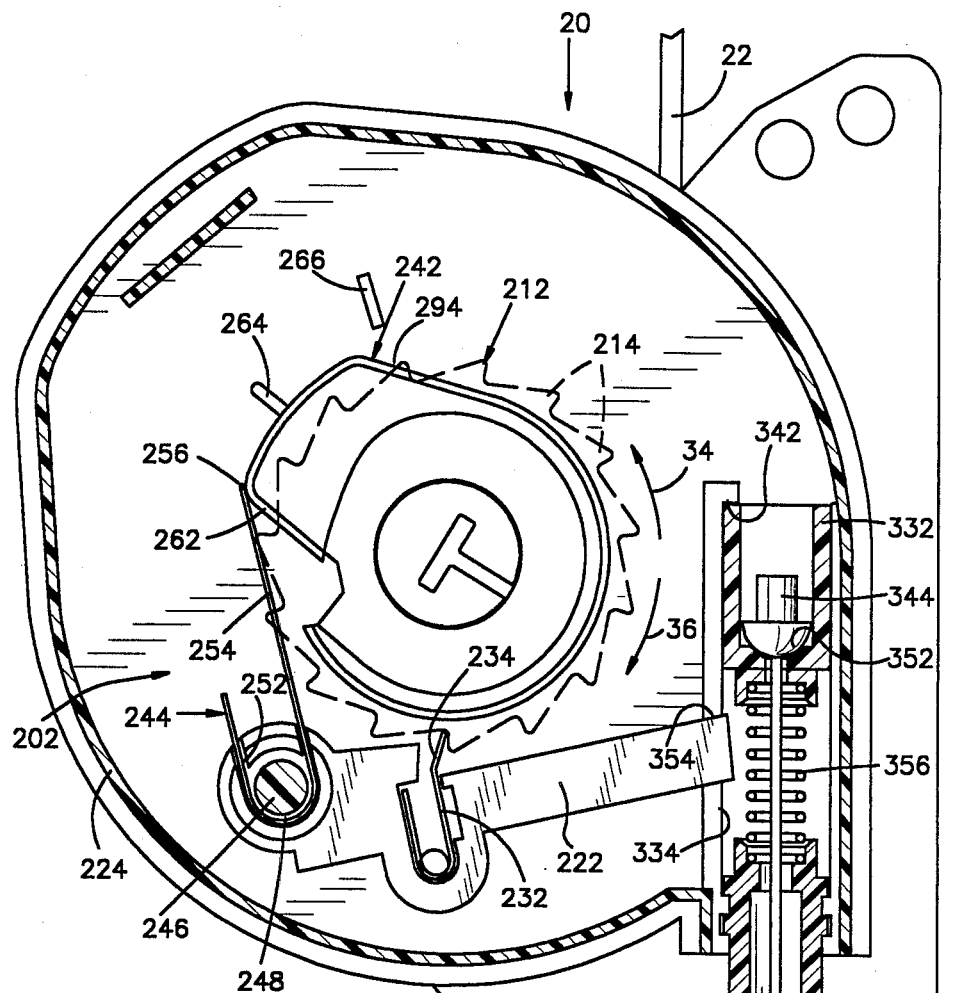
Figure 7:
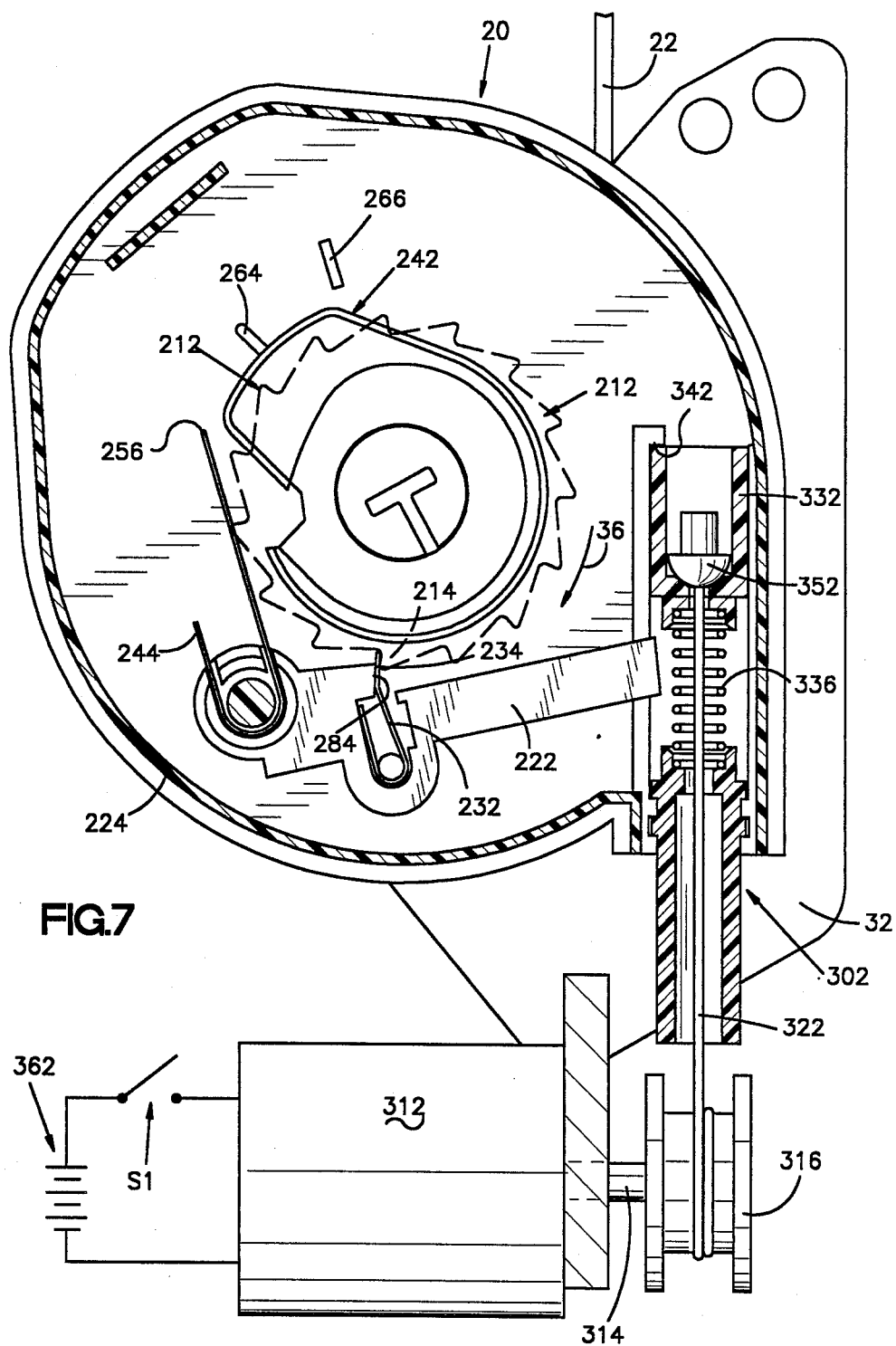
Figure 8:
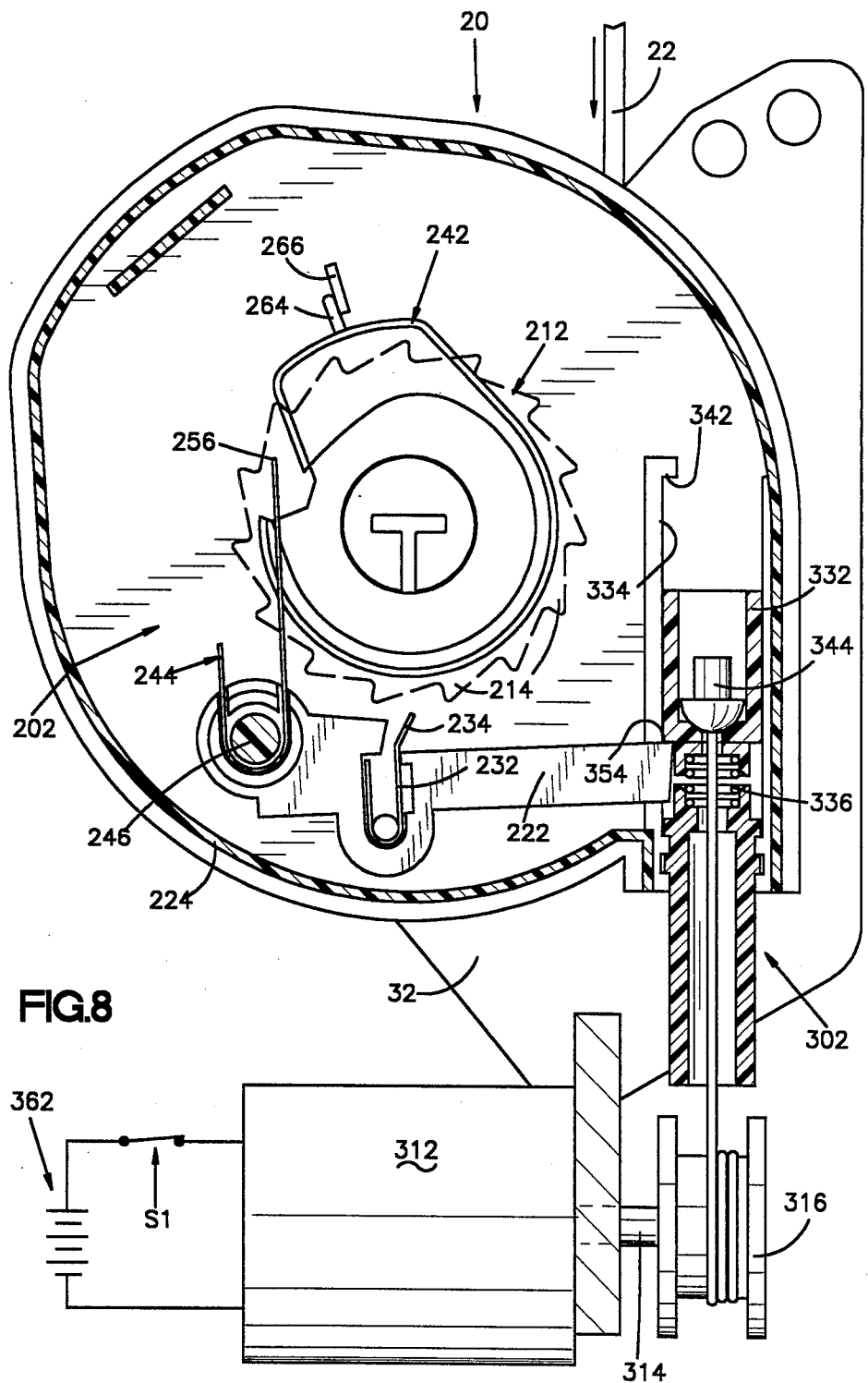

When the actuating surface 262 of the cam engages the end portion 256 of the spring arm 244, the latch 222 is pivoted toward the second ratchet wheel 212, as viewed in FIG. 6. Upon pivotal movement of the latch 222 toward the second ratchet wheel 212, the angled end portion 234 of the leaf spring 232 engages a tooth 214. Thus, the force of return spring 204 causing the spindle 24 to rotate in the belt retraction direction 36 is blocked by the leaf spring 232.

If the comfort mechanism 202 is actuated and the lever arm 164 engages a tooth 162 on the clutch disc 144, a double lock condition occurs. The spindle 24 will not be allowed to rotate in either the belt retraction direction 36 or in the belt withdrawal direction 34. The double lock is an undesirable condition.

A double lock condition can be brought about when, for example, the comfort mechanism 202 is actuated by the angled end portion 234 of the leaf spring 232 engaging a tooth 214 on the second ratchet wheel 212 and the vehicle decelerates above the predetermined rate, as in a panic stop. During the panic stop, the mass 172 (FIG. 5) moves relative to the cup 174 and pivots the lever arm 164 toward the inertia member 76. The belt webbing 22 is tensioned due to occupant movement during the panic stop, as is known. The tension in the belt webbing 22 rotates the spindle 24 in the belt withdrawal direction 34 and the lever arm 164 engages a tooth 162 on the clutch disk 144 of the inertia member 76 to block further rotation of the clutch disk. Tension on the belt webbing 22 is relaxed and the mass 172 moves from engaging the lever arm 164, when the panic stop ends. However, the lever arm 164 may not disengage the tooth 162 because the angle of the surface 166 of the tooth 162 that the lever arm 164 engages may hold the lever arm 164 from dropping out of engagement with the tooth 162. Thus, rotation of the spindle 24 is blocked in both the belt retraction direction 36 and the belt withdrawal direction 34.

In accordance with the present invention, the leaf spring 232 of the comfort mechanism 202 is resiliently deflectable. The spring rate of the return spring 204 is greater than the spring rate of the leaf spring 232, and the return spring 204 can thus deflect the leaf spring when it engages a tooth 214 on the second ratchet wheel 212. Deflection of the leaf spring 232, as viewed in FIG. 7, permits a relatively small amount of rotation of the spindle 24 in the belt retraction direction 36. As a result, the second ratchet wheel 212 is rotated in the belt retraction direction 36 and moves the tooth 162 away from the lever arm 164. Thus, the lever arm 164 may disengage the tooth 162 on the clutch disk 144 by dropping away from the clutch disc 144. This prevents the double lock condition.

The end portion 234 of the leaf spring 232 is resiliently deflectable between two limits. As illustrated in FIG. 2, the right leg of the leaf spring 232 engages the rightmost surface 282 of the groove in which the leaf spring is disposed. Upon deflection of the leaf spring 232 from the position of FIG. 2, due to rotation of the second ratchet wheel 212 in the belt retraction direction under the bias of the return spring 204, the leaf spring engages a leftmost stop surface 284, as viewed in FIG. 7. The stop surface 284 is carried by the latch 222 to prevent any further deflection beyond the position illustrated in FIG. 7 when the spindle 24 rotates in the belt retraction direction.

The angled end portion 234 of the leaf spring may also deflect when the spindle 24 rotates in the belt withdrawal direction 34, as illustrated in FIG. 9. When this occurs, the right leg portion of the leaf spring 232 engages the rightmost 282 surface of the U-shaped groove and the angled end portion 234 deflects or pivots clockwise. The angled end portion 234 engages an angled surface 292 of one of the teeth 214 so the angled end portion follows that tooth without ratcheting to the next tooth when the spindle 24 rotates in the belt withdrawal direction 34.

When the comfort mechanism 202 is deactuated, the latch 222 is pivoted away from the second ratchet wheel 212 so the angled end portion 234 of the leaf spring 232 does not engage a tooth 214. The comfort mechanism is deactuated by a pull-off device 302 (FIG. 6). The pull-off device 302 includes an electric motor 312 supported by the retractor frame 32. A shaft 314 extends from the electric motor 312. A drum 316 is connected to the shaft 314. An elongate flexible member or braided cord 322 is wound onto the drum 316 and extends into the housing 224. A slide 332 is supported for reciprocal movement within the housing 224 in a track 334. The slide 332 is biased upwardly by a spring 336 to a position where it does not engage the latch 222. A stop 342 at the end of the track 334 prevents movement of the slide 332 upwardly out of the track. An upper end portion of the braided cord 322 extends through an opening in the slide 332 and has a terminal end 344 crimped thereon for engaging an inner bottom surface 352 of the slide.

Upon energization of the electric motor 312, the braided cord 322 is wound onto the drum 316 and the braided cord is pulled downwardly until the terminal end 344 engages the bottom surface 352 of the slide 332.

The electric motor 312 is energized in response to opening a door of the vehicle. The braided cord 322 pulls the slide 332 into engagement with an end portion 354 of the latch 222. Upon further axial downward movement of the slide 332, the latch 222 is pivoted away from the second ratchet wheel 212 so the leaf spring 232 is moved from engaging the tooth 214.

The return spring 204 may then bias the seat belt webbing 22 to retract to a fully stored position on the spindle 24 of the retractor 20. The electric motor 312 is connected to a power source 362 of the vehicle, such as a battery or alternator. A normally opened switch S1 is disposed in series in a circuit with the electric motor 312 and the power source 362. The switch S1 closes when the vehicle door is opened to direct electrical power to the electric motor 312. The drum 316 is rotated by the electric motor 312 to tighten the braided cord 322. The circuit may also include a timer which applies power to the motor 312 for a certain period of time to assure that the motor rotates the drum a predetermine amount sufficient to move the slide 332 downwardly into engagement with the latch and pull the latch away from engaging the second ratchet wheel 212.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, I claim the following:

1. A seat belt retractor comprising:
a spindle having belt webbing wound thereon, said spindle being supported for rotation in belt retraction and belt withdrawal directions;
a return spring biasing said spindle to rotate in the belt retraction direction;
a ratchet wheel connected to said spindle for rotation therewith, said ratchet wheel having a plurality of teeth extending therefrom; and
resiliently deflectable means for engaging one of said plurality of teeth on said ratchet wheel and deflecting to allow a predetermined amount of rotation of said spindle in the belt retraction direction and to thereafter restrict rotation of said spindle in the belt retraction direction.

2. The seat belt retractor set forth in claim 1 further including a latch movable toward and away from said ratchet wheel and supporting said resiliently deflectable means for movement into and out of engagement with said one of said plurality of teeth on said ratchet wheel.

3. The seat belt retractor set forth in claim 2 further including means for limiting the amount of deflection of said resiliently deflectable means to restrict the rotation of said spindle in the belt retraction direction.

4. The seat belt retractor set forth in claim 3 wherein said limiting means includes a stop carried by said latch for engaging a portion of said resiliently deflectable means upon a predetermined amount of deflection of said resiliently deflectable means.

5. The seat belt retractor set forth in claim 2 wherein said resiliently deflectable means is a leaf spring having a portion extending from said latch in a direction towards said ratchet wheel for engaging one of said plurality of teeth of said ratchet wheel.

6. The seat belt retractor set forth in claim 2 further including means supporting said latch for pivotal movement.

7. The seat belt retractor set forth in claim 2 further including means for moving said latch in a direction away from said ratchet wheel to disengage said resiliently deflectable means from said one of said plurality of teeth enabling rotation of said spindle in the belt retraction direction.

8. A seat belt retractor for a vehicle comprising:
a spindle having belt webbing wound thereon, said spindle being supported for rotation in belt retraction and belt withdrawal directions;
a first ratchet wheel driven for rotation by said spindle, said first ratchet wheel having a plurality of teeth extending therefrom;
a first member movable into engagement with a tooth on said first ratchet wheel for blocking rotation of said first ratchet wheel in the belt withdrawal direction;
a second ratchet wheel connected to said spindle for rotation therewith, said second ratchet wheel having a plurality of teeth extending therefrom; and
means for preventing rotation of the spindle in the belt retraction direction and for preventing a double lock condition in which said member engages said first ratchet wheel to block rotation of said first ratchet wheel in the belt withdrawal direction and said second ratchet wheel is blocked from rotating in the belt retraction direction;
said means for preventing rotation of the spindle in a belt retraction direction including a latch movable toward and away from said second ratchet wheel, and a resiliently deflectable member carried by said latch for engaging one of said plurality of teeth on said second ratchet wheel to block rotation of said spindle in the belt retraction direction and to deflect to allow a predetermined amount of rotation of said spindle in the belt retraction direction to permit said member to disengage a tooth on said first ratchet wheel to prevent the double lock condition.

9. The seat belt retractor set forth in claim 8 wherein said means for preventing rotation of said spindle in the belt retraction direction includes means for limiting the amount of deflection of said resiliently deflectable member to restrict the rotation of said spindle in the belt retraction direction.

10. The seat belt retractor set forth in claim 9 wherein said limiting means includes a stop carried by said latch for engaging a portion of said resiliently deflectable member upon a predetermined amount of deflection of said resiliently deflectable member.

11. The seat belt retractor set forth in claim 8 further including means for blocking rotation of said spindle in the belt withdrawal direction upon relative rotation between said first ratchet wheel and said spindle in response to belt webbing withdrawal at a rate above a predetermined rate.

12. The seat belt retractor set forth in claim 8 further including a mass for moving said member into engagement with said tooth on said first ratchet wheel in response to acceleration or deceleration of the vehicle at a rate above a predetermined rate.

13. A seat belt retractor for use in a vehicle, said seat belt retractor comprising:
a spindle having belt webbing wound thereon, said spindle being supported for rotation in belt retraction and belt withdrawal directions;
a return spring biasing said spindle to rotate in the belt retraction direction;

first means movable to a position for blocking rotation of said spindle in the belt retraction direction under the bias of said return spring;

a rotatable drum;

actuable drive means for rotatably driving said drum;

an elongate flexible member connected at a first end portion to said drum and at a second opposite end portion with said first means; and second means for actuating said drive means to wind said elongate flexible member onto said rotatable drum to move said first means from the position blocking rotation of said spindle in the belt retraction direction;

said first means including a ratchet wheel having a plurality of teeth extending therefrom, pawl means movable into and out of engagement with said ratchet wheel, and a slide for moving said pawl means out of engagement with said ratchet wheel upon movement thereof, said second end portion of said elongate flexible member being connectable with said slide to move said slide from a first position in which said slide is disengaged from said pawl means to a second position in which said slide engages said pawl means to move said pawl means out of engagement with said ratchet wheel.

14. The seat belt retractor set forth in claim 13 further including means for actuating said drive means in response to opening a door of the vehicle.

15. A seat belt retractor for a vehicle comprising:

a spindle belt webbing wound thereon, said spindle being supported for rotation in belt retraction and belt withdrawal directions;

a first ratchet wheel driven for rotation by said spindle, said first ratchet wheel having a plurality of teeth extending therefrom;

a first member movable into engagement with a tooth on said first ratchet wheel for blocking rotation of said first ratchet wheel in the belt withdrawal direction;

a second ratchet wheel connected to said spindle for rotation therewith, said second ratchet wheel having a plurality of teeth extending therefrom; and means for preventing rotation of the spindle in the belt retraction direction and for preventing a double lock condition in which said first member engages said first ratchet wheel to block rotation of said first ratchet wheel in the belt withdrawal direction and said second ratchet wheel is blocked from rotating in the belt retraction direction;

said preventing means comprising a second member movable into engagement with a tooth on said second ratchet wheel for blocking rotation of said second ratchet wheel in the belt retraction direction, said second member being movable from a first position in engagement with a tooth of said second ratchet wheel to a second position thereof in engagement with said tooth of said second ratchet wheel to permit limited rotation of said second ratchet wheel in the belt retraction direction and to thus permit said first member to disengage said tooth on said first ratchet wheel to thereby prevent a double lock condition.

* * * * *